Feb. 14, 1961 N. L. GREENMAN ET AL 2,972,003

PRINTED CIRCUITS AND METHODS OF MAKING THE SAME

Filed Feb. 21, 1956 3 Sheets-Sheet 1

INVENTORS.
Norman L. Greenman
BY John A. Zagusta and
Paul L. Anderson
J. Stanley Churchill
ATTORNEY

PRINTED CIRCUITS AND METHODS OF MAKING THE SAME

Filed Feb. 21, 1956 3 Sheets-Sheet 2

INVENTORS
Norman L. Greenman
John A. Zagusta and
Paul L. Anderson
BY J. Stanley Churchill
ATTORNEY

PRINTED CIRCUITS AND METHODS OF MAKING THE SAME

Filed Feb. 21, 1956 3 Sheets-Sheet 3

INVENTORS
Norman L. Greenman
BY John A. Zagusta and
Paul L. Anderson
J. Stanley Churchill
ATTORNEY United States Patent Office
2,972,003
Patented Feb. 14, 1961

2,972,003

PRINTED CIRCUITS AND METHODS OF MAKING THE SAME

Norman L. Greenman, Danielson, Conn., John A. Zagusta, Jackson Heights, N.Y., and Paul L. Anderson, Rockville, Conn., assignors to Rogers Corporation, Manchester, Conn., a corporation of Massachusetts Filed Feb. 21, 1956, Ser. No. 566,962

13 Claims. (Cl. 174—68.5)

This invention relates to printed circuits and to methods of making the same.

In general one object of the invention is to produce novel printed circuits embodying a molded insulating base member and an electrically conductive pattern secured to one or more surfaces of the molded insulating base member.

Other objects of the invention are to provide novel methods for the economical production of the novel printed circuits.

With these general objects in view and such others as may hereinafter appear, the invention consists in the novel printed circuits and novel methods of making the same hereinafter described and particularly defined in the claims at the end of this specification.

In the drawings illustrating the preferred embodiment of the invention:

Figure 1:
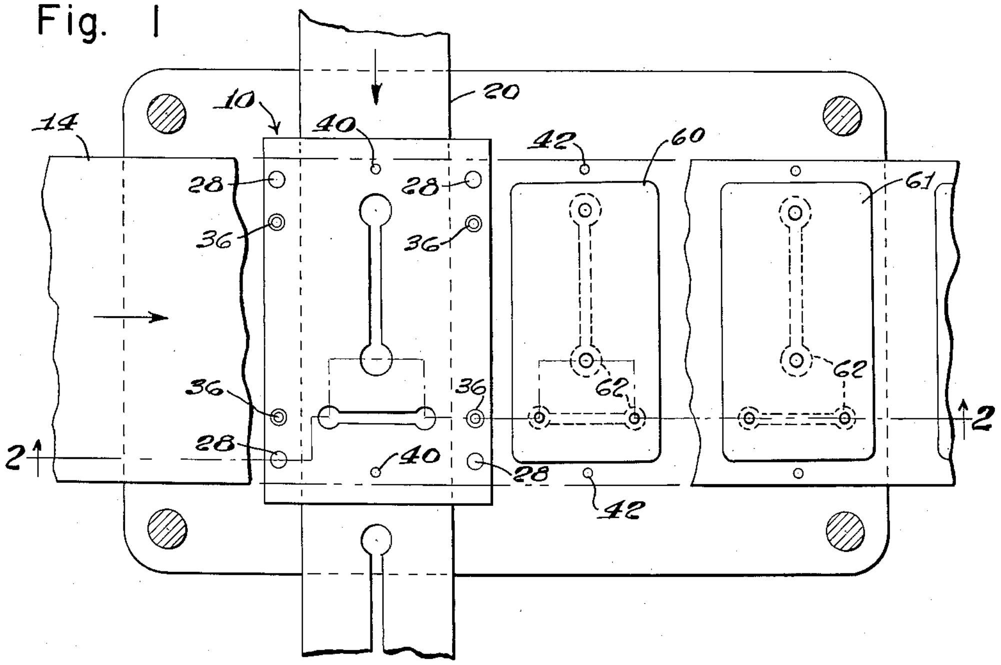
Fig. 1 is a bottom plan view as seen from the line 1—1 of Fig. 2 of a preferred form of apparatus employed in producing the present printed circuits.

The types of so-called printed circuits which have heretofore been proposed include those in which sheets of a metal, such as copper or silver, are adhered in sheet form to an insulating base comprising a plastic laminated sheet formed using a thermosetting resin, such as phenol formaldehyde resin, as an impregnant of the paper laminae of which the plastic laminate is made under substantial heat and pressure. The four general types of printed circuit parts involve the chassis type for eliminating wiring and hand-soldering of assemblies; the switch commutators to replace costly fabricated and assembled parts; circuit elements replacing conventional capacitors and coils; and printed wires to replace wired harnesses.

In producing many of the printed circuit sheets by prior art methods, copper-clad laminated plastic sheets have been used in processes which involve the application of an acid resistant film to the copper surface in the specified pattern areas. Immersion in acid then etches away the unwanted copper, and the removal of the resist left the desired copper pattern affixed to the surface of the base. Thereafter the part was fabricated by conventional piercing and blanking tools to the desired dimensions and holes for the reception of the various hardware items, such as terminals, connectors and the like, were punched through the copper pattern and through the insulating base member.

In one aspect of the present invention the so-called printed circuit is formed by making an assembly of a moldable insulating base sheet having the requisite physical and electrical properties and upon a surface of which an electrically detailed metallic pattern may be secured in accordance with any of the prior methods heretofore proposed, as will be hereinafter pointed out, and also in accordance with the preferred methods, as will be hereinafter pointed out. The assemblies may be provided with holes for the reception of accessory elements, such as terminals, connectors and the like, by ordinary punching operations or in any other suitable manner, as by formation during the molding operation. After the assembly has been produced, as thus far described, it may be molded and the accessory elements anchored in the base by the flow of moldable material during the molding operation in and around the terminals, connectors, or other accessory elements, thus producing a molded assembly in a most economical and practical manner.

One of the principal advantages flows from the fact that the assembly, as thus far described, lends itself to molding operations in which it may be formed and cured by the proper temperature, time and pressure cycle to a three-dimensional shape, as distinguished from the phenolic laminates which have been generally heretofore used for the production of printed circuits and which have been available in flat, fully cured sheets, thereby restricting the pattern and the board to planar or two-dimensional surfaces. For example, the present assembly may be molded and shaped to form right angle pieces to provide the structure with ribs for reinforcing purposes, to enable slots to be molded therein which otherwise would have to be machined to provide mounting corners for the assembly and to enable the whole chassis of the printed circuit to be molded. Tapered holes for the accessories and molded edges may be formed during the molding operation. In general this characteristic opens up a wide range of design possibilities as compared to the limitations of the flat, punched phenolic laminates above referred to.

Preferably, the invention contemplates a moldable fibrous resin base preferably embodying a curable resin. The metal conductive pattern may be formed and applied by a stamping operation and adhesively affixed to the surface of the moldable fibrous base. Thereafter the openings or holes for the reception of the terminal pins, socket pins, eyelets or other hardware can be molded into the base without prepunching the uncured sheet, and eliminating subsequent drilling, mounting and staking operations. After the basic pattern has been applied, then the assembly is subjected to molding at temperatures and pressures according to the particular resin employed resulting in the formation of a resin skin covering all edges of the base assembly, and in addition covering the walls of any holes which have been formed in the base, either prior to or during the molding operation. This skin of resin distinguishes the present molded base from the prior art structures and represents a very substantial advance in the art in that the moisture absorption characteristics and the accompanying effect on the electric insulating properties of the base are greatly reduced. The molding operation may and preferably will result in the production of a finished molded electrically conductive pattern whose upper surface is flush with the surface of the base, allowing portions or all of the pattern to be used as a switch or commutator stator. In addition the pattern can be embossed onto or raised above the surface.

Figure 2:
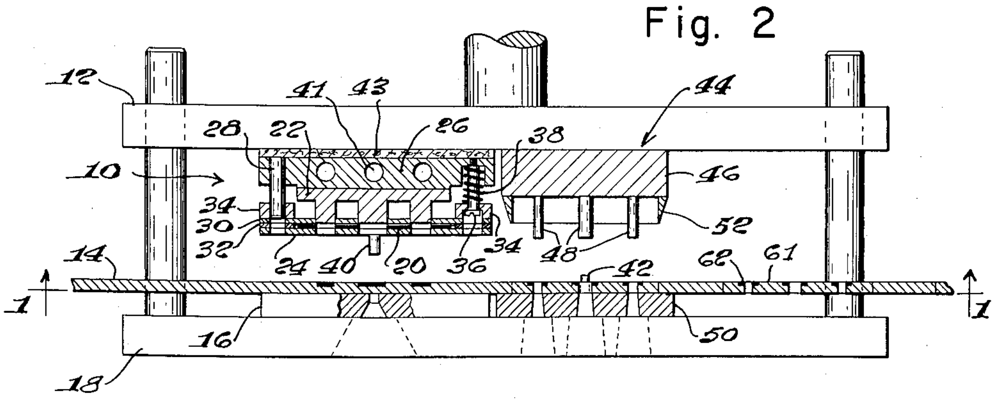
Fig. 2 is a cross sectional view of the apparatus taken on the line 2—2 of Fig. 1.

Referring now to the drawings and particularly to Figs. 1 and 2, the preferred form of apparatus for stamping out and adhesively securing the metallic pattern to the surface of the moldable base material to form the so-called printed circuit includes a pattern-blanking and embedding die, indicated generally at 10, which may be mounted on the underside of the movable member 12 of a conventional punch press as shown. The insulating base material which may comprise an elongated strip of moldable fibrous sheet material 14 is fed under the die unit 10 on top of a base die member 16 attached to the stationary member 18 of the punch press. An elongated strip of metal foil 20 having its underside provided with a coating of adhesive is fed between male and female blanking dies 22, 24 respectively of the die unit 10 in a direction at right angles to the base material as shown. The male blanking die 22 may be attached to an upper supporting member 26 secured to the underside of the movable member 12, and the member 26 is provided with a plurality of guide pins 28 upon which the female die unit is slidingly mounted. The female blanking die unit includes a metal stripping plate 30 separated from the female die 24 by spacers 32, the stripping plate being secured to and movable with the female die. The guide pins 28 extend through openings in frame members 34 forming a part of the female die supporting frame. As herein shown, the female die unit may be supported on shouldered pins or bolts 36 secured to and depending from the supporting member 26, the heads or shouldered portions of the bolts being received in counterbored portions of the frame members 34. Springs 38 coiled about the pins 36 and interposed between the supporting member 26 and the frame member 34 urge the female die unit downwardly against the shouldered portions and maintain the female die 24 spaced from the male die 22 when the blanking die unit is in its elevated position, as shown in Fig. 2. Thus the metal foil strip 20 may be inserted in the space between the female die 24 and the stripping plate 30. It will be observed that the cutting portions of the male die 22 are extended within the corresponding openings in the stripping plate. The female die unit is further provided with indexing punches 40 for piercing the insulating base material for registration purposes.

In the operation of the apparatus when the movable member 12 of the punch press is lowered, the indexing punches 40 first engage and pierce the insulating base material 14 in cooperation with the base die member 16, suitable tapered openings being provided to permit the scrap material to fall through the base 16 and member 18 as shown. Thereafter when the female blanking die 24 comes to rest flat against the base material, the male blanking die 22 is advanced relative to the female die to cut and blank the metal foil pattern through the female die, the metal foil pattern being transferred to and preferably embedded in the surface of the moldable base material, the metal foil pattern adhering to the surface of the base by virtue of the adhesive coating on the underside of the metal foil.

In practice the metal foil may be provided with a heat curable adhesive of the type which may be subsequently cured by the application of both heat and pressure or heat alone during the molding operation. Typical of such adhesives are:

Phenolic Butyral Adhesives—manufactured by Bakelite Co. and sold under the name B.J. 16320.

Modified Epoxy Adhesives—manufactured by Rubber & Asbestos Corp. and sold as "Ply-Master."

In this instance the male blanking die 22 may be heated to render the adhesive tacky and insure the adherence of the metal foil to the base material during the transfer operation. If desired, we may heat the surface of the base material and slightly warm the male blanking die in order to effect this desired tackiness. In both events the adhesive is subsequently cured during the molding operation. As illustrated in Fig. 2, the male die supporting member 26 may be provided with heating coils, indicated generally at 41, and the supporting member may be spaced from the movable member 12 of the punch press by an asbestos sheet material 43.

Thereafter upon elevation of the blanking die unit the metal stripping plate 30 effects removal of the metal foil skeleton from the male die 22, and the metal strip may then be advanced to present an unblanked portion between the dies in readiness for a succeeding cycle of operation. The strip of insulating base material with its metal foil pattern attached is then advanced to position the pierced registration holes over indexing pins 42 provided at the next station of operation comprising the hole piercing and insulating base blanking station, indicated generally at 44. As herein shown, the piercing and blanking station 44 includes a supporting member 46 secured to the underside of the punch press member 12 and is provided with a plurality of punches 48 for piercing openings in the metal foil pattern and through the insulating base material. The base material is supported at this station on a die member 50 having die openings for cooperation with the punches 48 to effect piercing of the holes when the punch press is operated to lower the piercing unit, the die openings being tapered and aligned with openings in the stationary member 26 for waste clearance. The supporting member 46 is also provided with a steel rule die cutter 52 arranged to partially cut the base material to the desired shape, herein shown as a substantially rectangular shape.

Figure 3:
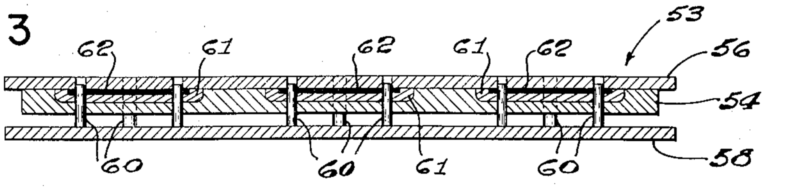
Fig. 3 is a cross sectional view of a flash mold employed in processing the present printed circuits.

Upon elevation of the piercing and base blanking unit the strip of insulating material is advanced, and the individual base member 61 with its electrically conductive pattern 62 is removed from the strip and placed with other similar base members in a flash mold indicated generally at 53 in Fig. 3. The illustrated mold includes a bottom plate 54 provided with cavities into which the individual base members are placed; a top plate 56; and a pin carrying plate 58 provided with sizing pins 60 corresponding to the pierced openings in the base members, the top and bottom plates being drilled to receive the sizing pins 60 as shown. It will be understood that any other type of mold may be used, such for example as a semi-flash mold, a positive mold and any others now used in accordance with accepted molding practices.

The assembly may then be subjected to heat and pressure sufficient to effect curing of the moldable fibrous material and to result in the formation of a resin skin covering the exterior surfaces of the base assembly and the walls of the holes therein. As shown in Fig. 3, the electrically conductive pattern is preferably substantially flush with the surface of the base in the finished product. In practice if the holes are pierced to allow insertion of molded in elements, the holes may be made slightly oversize so that the flow of the resin around the sizing pins in the holes during the molding operation will size the holes to accurate dimensions and will permit formation of the moisture resistant skin around the walls of the holes. After the curing operation the pin carrying plate 58 may be removed prior to opening the mold. During the molding operation the adhesive on the metal foil is cured and effects secure bonding of the electrically conductive pattern to the base material. Preferably the product may be subjected to a subsequent baking operation to insure completion of the bonding and curing.

Figure 4:
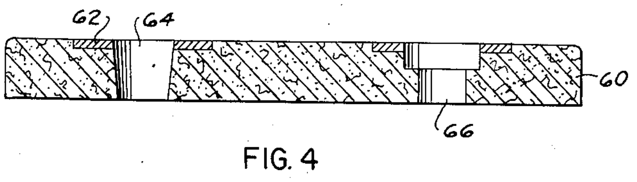
Figs. 4 to 10 are cross sectional detail views of various modifications of the present molded insulating base provided with an electrically conductive pattern.
Figure 5:
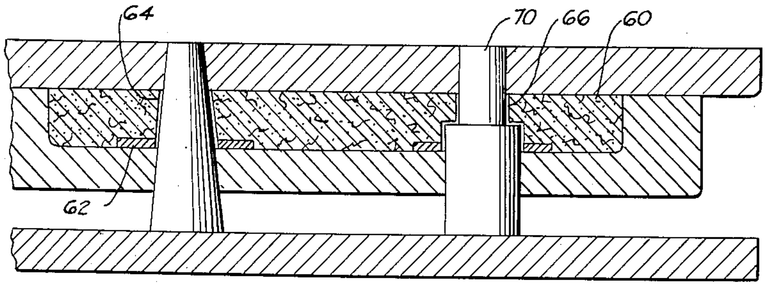
Figure 6:
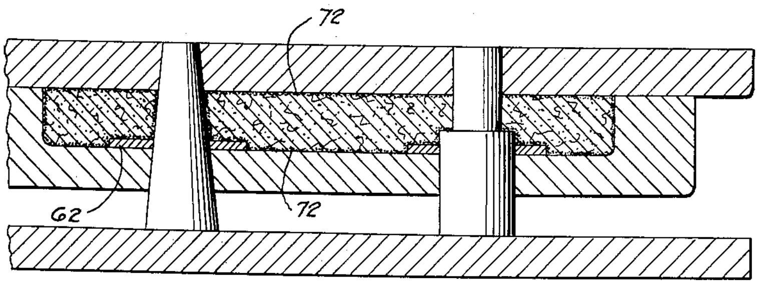

Fig. 4 illustrates the present insulating base 61 having an electrically conductive pattern 62 affixed thereto wherein a tapered hole 64 and a stepped hole 66 is provided in the base during the molding operation. Fig. 5 shows the base assembly 60 placed in a mold having tapered and stepped pins 68, 70 respectively in the pin carrying member of the mold for insertion into the correspondingly shaped openings, the holes being shown as slightly oversize in Fig. 5. Fig. 6 is a view similar to Fig. 5 showing the base assembly after the molding operation wherein the resin flow forms a skin, indicated by stipple work 72, around the exterior surface of the base and around the walls of the openings.

Figure 7:
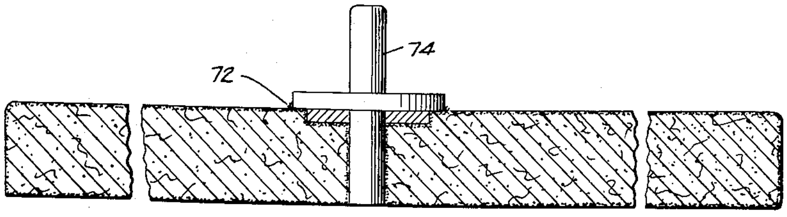

Fig. 7 is a detail view illustrating a base member having an electrically conductive pattern produced in accordance with the present invention wherein an accessory element 74 is molded into an opening in the base material and wherein the moisture resistant skin formation 72 extends around the edges of the accessory element.

Figure 8:
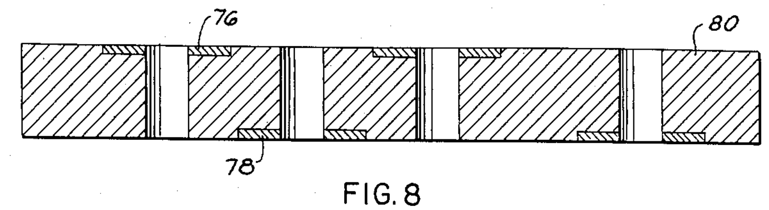
Figure 9:
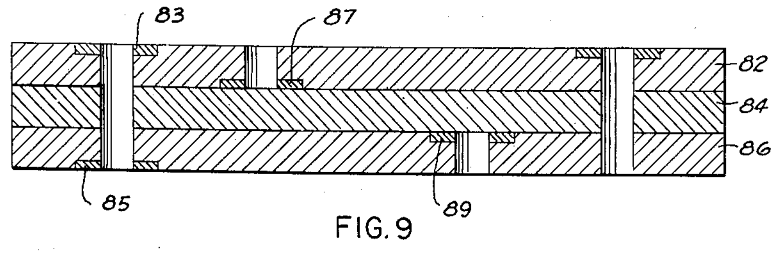

In practice the present method and apparatus is adapted to provide electrically conductive patterns 76, 78 on both sides of an insulating base sheet 80, as shown in Fig. 8, by merely passing the sheet through the apparatus a second time in an inverted position, different patterns being provided by changing the stamping and piercing dies as required. Likewise a sandwich type unit shown in Fig. 9 may be produced by placing several different sheets 82, 84, 86 in superimposed relation in the mold and subjecting the assembly to heat and pressure to form a unitary member provided with upper and lower electrically conductive patterns 83, 85 and with intermediate patterns 87, 89 as illustrated.

Figure 10:
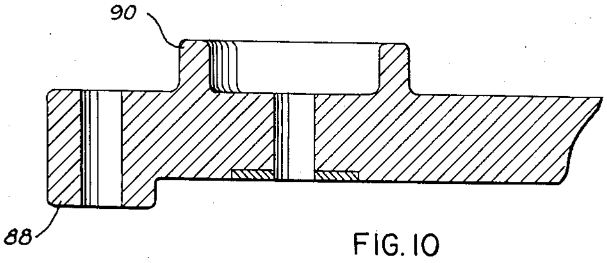

Fig. 10 illustrates other typical effects capable of being achieved in accordance with the present method of molding an electrically conductive pattern to a moldable fibrous base sheet wherein the mounting corners, as shown at 88, and an insulating barrier, indicated at 90, may be provided on the moldable base material.

From the description thus far it will be observed that during the molding operation a resin skin is produced covering all edges, surfaces and the walls of holes, thereby preventing the resin in the body of a fibrous sheet from flowing beyond such edges and surfaces and reducing to a minimum moisture absorbence. When the terminal pins, socket pins, eyelets and other hardware are assembled in the fibrous sheet the molding operation operates to flow the resin around such hardware and to firmly mold the same into the base, thereby eliminating any subsequent drilling, mounting and staking operations. When non-tapered holes are produced during the molding operation the wall structure is far superior to that produced by punching operations. Microscopic examinations have revealed that the punching operations result in rough walls of a porous nature and with many fibers exposed. This interferes with plating operations, and experience has shown that the resinous skin which covers the walls of holes produced during the molding of the holes contributes to the success of the plating operation. When molded tapered holes or their equivalent are produced, the wall structure being covered with a resinous skin of a dense non-fibrous nature contributes to the success of the soldering operation because of the better flow of the solder from the small to the large end of the hole.

As above indicated, the circuit forming metal pattern may be applied to the curable base sheet, such for example, as to a fiber board sheet impregnated with a resin, preferably of the heat and pressure curable type by any of the known methods, such for example, as by the transfer method wherein a metal foil is laminated to a base sheet and then printed and etched, and the base sheet with the etched pattern is placed face down on the core stock and the pattern transferred thereto during the molding operation. Another method involves the application of a metallic surface by plating on the surface of the molded piece. Another method involves the bonding of a metallic foil to the core stock by suitable adhesive and molding followed by the printing of the circuit pattern on the surface of the foil, then etching the undesired metal. The advantages of a molded circuit is thus obtained. A still further method involves the embossing of the pattern on the surface of the stock, then spraying or plating a metallic film over the entire surface and grinding off the metal on the raised portions of the embossed surface, leaving the metallic pattern in the depressions. The circuit may be plated directly onto the molded sheet by methods well known to the art. It will be understood that any of these or any other methods may be employed in applying the metallic circuit pattern to the surface of the moldable core stock or molded piece.

The blanking process herein illustrated and described above is most effective with heavy foil, as for example, of a thickness of 0.003 inch and over, whereas the etching process is unsuitable because of undercutting of heavier foils by the etching solution. In the plating process resinous skin resulting from the present molding operation enables the plating to go through the holes more advantageously.

In the production of the present molded printed circuit sheet it is preferred to utilize a synthetic resin for the surface coating which will cure under heat and pressure during the molding operation including epoxy resins, phenolic formaldehyde resins, the various commercial polyester resins, the melamine resins, the silicones and others. This surface coating is preferably of a nature such as to be substantially non-flowing during molding, thus insuring that no resin skin forms over the electrically conductive pattern. The formation of such skin would interfere with the soldering operations.

It is preferred to use thermosetting resins as the impregnant for the fibrous board or sheet, and such resins may be of the heat curable type, of the pressure curable type, and preferably of the heat and pressure curable type. Such resins include the phenolic formaldehyde resins, the melamine resins, epoxy resins, polyester resins, the urea formaldehyde resins, silicones and others. Preferably, portions of such resins may vary from 25% to 70% by weight based on the weight of the finished product.

While it is preferred that a fibrous board sheet be used, such fibers may include cellulose, glass, asbestos, similar fibers, such as polyamide, polyester and aluminum oxide fibers and various mineral fibers or any combinations thereof, and in the broader aspect of the invention any moldable sheet material can be used as the base for the reception of the metallic circuit pattern prior to the molding operations.

While the preferred embodiment of the invention has been herein illustrated and described, it will be understood that the invention may be embodied in other forms within the scope of the following claims.

Having thus described the invention, what is claimed is:

1. In the method of making a so-called printed circuit, the steps comprising die cutting an electrically conductive pattern from a conductive material and then applying and adhesively securing the electrically conductive pattern on a surface of a moldable insulating fibrous base sheet embodying a curable resin as an impregnant thereof, and then subjecting the assembly of the pattern and the base sheet to a molding operation at temperatures and pressures which cause the base sheet to assume a predetermined shape and the curable resin impregnant to flow to cause a molded skin to be formed upon and to cover all edges of the sheet to thereby reduce to a minimum the water absorption therethrough.

2. In the method of making a so-called printed circuit, the steps comprising die cutting an electrically conductive pattern from a conductive material and then applying and adhesively securing the electrically conductive pattern on a surface of a moldable insulating fibrous base sheet embodying a curable resin as an impregnant thereof, forming holes through portions of the conductive pattern, and then subjecting the assembly of the pattern and the base sheet to a molding operation at temperatures and pressures which cause the base sheet to assume a predetermined shape and the curable resin impregnant to flow to cause a molded skin to be formed upon and to cover all surfaces and edges of the sheet and walls of the holes to thereby reduce to a minimum the water absorption therethrough.

3. In the method of making a so-called printed circuit, the steps comprising die cutting an electrically conductive pattern from a conductive material and then applying and adhesively securing the electrically conductive pattern on a surface of a moldable insulating fibrous base sheet embodying a curable resin as an impregnant thereof, and then subjecting the assembly of the pattern and the base sheet to a molding operation, forming holes in the base sheet during the molding operation for the reception of accessories, said molding operation being conducted at temperatures and pressures which cause the base sheet to assume a predetermined shape and the curable resin impregnant to flow to cause a molded skin to be formed upon and to cover all edges of the sheet and walls of the holes to thereby reduce to a minimum the water absorption therethrough.

4. In the method of producing a so-called printed circuit, the steps comprising feeding a sheet of metal foil into predetermined position with relation to a moldable fibrous base sheet embodying a curable resin as an impregnant thereof and to a die for producing the electrically conductive metallic pattern, dieing out the pattern from the metal foil, and then affixing it to the surface of the moldable fibrous base sheet, then introducing the assembly including the base sheet and the metal foil pattern into a mold and molding the same at predetermined temperatures and pressures selected to mold the base sheet into predetermined shape and to flow moldable material around the edges of the sheet to provide the same with a moisture resisting skin coating.

5. In the method of making a printed circuit, the steps comprising subjecting a sheet of fibrous moldable material embodying a curable resin impregnant to a molding operation at temperatures and pressures which cause the sheet to assume a predetermined shape and the curable resin impregnant to flow to cause a molded skin to be formed upon and to cover all edges of the sheet to thereby reduce to a minimum the water absorption therethrough, and then forming an electrically conductive metallic pattern on the surface of the molded sheet.

6. In the method of making a printed circuit, the steps comprising forming an electrically conductive pattern on a surface of a moldable fibrous base sheet embodying a curable resin as an impregnant thereof, forming holes in said base sheet for the reception of accessories, introducing the accessories into the holes, and then subjecting the sheet to a molding operation to cause the sheet to assume a predetermined shape and to cause the resin impregnant to flow over the exposed surfaces of the sheet and into said holes to form a moisture resisting skin coating and to anchor and mold the accessories therein.

7. The method as defined in claim 5 wherein the base sheet and conductive pattern are molded into a three-dimensional shape.

8. The method as defined in claim 5 wherein holes for the reception of accessories are formed during the molding operation.

9. A printed circuit assembly comprising a moldable insulating fibrous base sheet having in its unmolded condition a resinous impregnant distributed throughout the fibers of the base sheet, a preformed electrically conductive pattern superimposed upon at least one surface of said base sheet, and means for securing the pattern to the base sheet, portions of said pattern and base sheet having holes extending through the pattern and base sheet for the reception of accessory elements, and a resinous film covering all of the exposed portions of the base sheet after molding the assembly, thereby providing a substantially waterproof assembly.

10. An assembly as defined in claim 9 wherein the opposed walls of the preformed circuit pattern are substantially parallel with relation to each other.

11. An assembly as defined in claim 9 wherein the holes for the accessory elements are larger at one side of the sheet.

12. An assembly as defined in claim 9 wherein the holes for the accessory elements are larger at one side of the sheet and are tapered toward the other side of the sheet.

13. In the method of producing a printed circuit, the steps comprising feeding a strip of metal foil having a heat curable adhesive coating on one side thereof into predetermined position with relation to a moldable fibrous base sheet embodying a curable resin as an impregnant thereof and to a blanking die for preforming an electrically conductive metal pattern, dieing out the pattern from the metal foil and pressing the pattern onto the surface of the moldable fibrous base sheet, then piercing the assembly to provide oversize holes therethrough for the reception of accessories, and then introducing the assembly into a mold provided with sizing pins extended through said holes and leaving an annular space between the pins and the holes and molding the same at predetermined temperatures and pressures selected to mold the base sheet into predetermined shape; to cure the heat curable adhesive to bond the metal pattern to the sheet; and to cause the resin impregnant to flow to provide a moisture-resistive skin formed upon and covering all surfaces and edges of the sheet and walls of the holes around the sizing pins to thereby reduce to a minimum the water absorption therethrough.

References Cited in the file of this patent

UNITED STATES PATENTS

| | | |
|---|---|---|
| 2,695,351 | Beck | Nov. 23, 1954 |
| 2,716,268 | Steigerwalt | Aug. 30, 1955 |
| 2,734,150 | Beck | Feb. 7, 1956 |
| 2,757,443 | Steigerwalt | Aug. 7, 1956 |
| 2,772,501 | Malcolm | Dec. 4, 1956 |

FOREIGN PATENTS

| | | |
|---|---|---|
| 596,830 | Germany | Apr. 26, 1934 |

OTHER REFERENCES

Electronic Design, August 1955, pages 38–39, "Materials for Stamped-Out Printed Circuits."